(12) United States Patent
Matteucci et al.

(10) Patent No.: US 7,594,437 B2
(45) Date of Patent: Sep. 29, 2009

(54) MACHINE FOR BALANCING VEHICLE WHEELS

(75) Inventors: Marco Matteucci, Rio Saliceto (IT); Marco Montanari, Campegine (IT); Roberto Nicolini, Rio Saliceto (IT)

(73) Assignee: SICAM S.R.L., Correggio (IT)

( * ) Notice: Subject to any disclaimer, the term of this patent is extended or adjusted under 35 U.S.C. 154(b) by 343 days.

(21) Appl. No.: 11/516,607

(22) Filed: Sep. 7, 2006

(65) Prior Publication Data
US 2007/0069571 A1 Mar. 29, 2007

(30) Foreign Application Priority Data
Sep. 9, 2005 (IT) .......................... MO2005A0226

(51) Int. Cl.
*G01M 1/16* (2006.01)
(52) U.S. Cl. ............................ 73/460; 301/5.21; 73/457
(58) Field of Classification Search ................... 73/460, 73/457, 462, 473; 301/5.21
See application file for complete search history.

(56) References Cited
U.S. PATENT DOCUMENTS

| | | | | |
|---|---|---|---|---|
| 4,435,982 A | * | 3/1984 | Borner et al. ................. | 73/462 |
| 5,054,918 A | * | 10/1991 | Downing et al. ....... | 356/139.09 |
| 6,360,593 B1 | * | 3/2002 | Schoenfeld ................... | 73/146 |
| 6,408,528 B1 | | 6/2002 | Diez | |
| 6,672,158 B1 | * | 1/2004 | Goebel et al. ................. | 73/462 |
| 6,772,626 B1 | * | 8/2004 | Engel et al. ................... | 73/146 |
| 6,789,422 B1 | * | 9/2004 | Ward, Jr. ..................... | 73/462 |

* cited by examiner

*Primary Examiner*—Hezron Williams
*Assistant Examiner*—Samir M Shah
(74) *Attorney, Agent, or Firm*—Hoffman, Wasson & Gitler

(57) ABSTRACT

A machine for balancing vehicle wheels, such wheels including a rim with a pair of axially spaced, ring-shaped or annular, flanges, and a tire seated up on the rim. The machine includes a frame with motor driven devices for gripping the vehicle wheel to be balanced and rotating same about a horizontal axis. A mechanical feeler, or probe, determines the position of the first of the pair of , flanges on the rim. A contact-less, or remotely spaced, sensor, such as a laser, ascertains the profile of the tire by taking a series of discrete measurements without touching the tire. The mechanical feeler, or probe, and the contact-less sensor, are connected to a control unit in the machine. The control unit interpolates the values provided by the mechanical feeler and the contact-less sensor, and determines the location of the second flange on the wheel rim. The control unit may include an archive, or database, of the dimensions of known rims, to facilitate the accurate determination of the location of the second flange, on the wheel rim.

18 Claims, 5 Drawing Sheets

MACHINE FOR BALANCING VEHICLE WHEELS

BACKGROUND OF THE INVENTION

The present invention refers to a machine for balancing vehicle wheels.

To this end, known balancing machines are usually equipped with a pair of mechanical feelers which can be positioned adjacent both ring-shaped flanges so their positions can be detected.

Alternatively, it is common practice to replace the two feelers with a contact-less measuring sensor (laser, ultrasound or the like), fitted with a movement and orientation device, so it can be aimed at the tire and at the rim so the position of the ring-shaped flanges can be detected without having to remove/fit the tire from/on the wheel rim.

Other types of balancing machines are equipped with a contact-less sensor alongside the wheel tread which normally detects any unevenness on the tire. However, if this type of sensor is required to detect the position of the ring-shaped flanges on the wheel rim, the tire has to be removed from the wheel so the rim can be inspected correctly.

The balancing machines of the type known are susceptible to additional improvement aimed at achieving greater simplicity from a structural point of view plus increasing flexibility and efficiency of use from an operational point of view.

As a matter of fact, a pair of feelers and/or a sensor movement/orientation device can often complicate considerably the working of traditional balancing machines.

The fact that the tire has to be taken off or removed, and then put back on the wheel is an additional, and inconvenient operation, that is not always easy or practical to perform.

BRIEF SUMMARY OF THE INVENTION

The main aim of this invention is to devise a machine for balancing vehicle wheels that makes it possible to achieve the above mentioned improvements and which allows, in particular, the detection of the position of the ring-shaped flanges on the wheel rim simply without the need for complex mechanisms, and without taking the tire off its rim and then putting the tire back on the rim.

As part of such technical aim, another purpose of the present invention is to achieve the previous aims with a simple structure, capable of relatively practical implementation, safe in use and effective in operation, and at a relatively low cost.

This aim and these purposes are all achieved by this machine for balancing vehicle wheels, comprising a supporting frame for retaining the gripping and rotation means of a wheel to be balanced around a substantially horizontal axis, measuring means for detecting the position, or location, of a first ring-shaped flange of the wheel rim, and contact-less detection means for determining the shape of at least one portion of the tire profile. Applicants' machine is characterised by the fact that it further comprises a processing and control unit, operatively associated with said measuring means and with said detection means for calculating the position of the second ring-shaped flange of the wheel rim, dependent upon the values detected by said measuring means and said detection means.

BRIEF DESCRIPTION OF THE DRAWINGS

Further characteristics and advantages of this invention will appear even more evident from the detailed description of a preferred, but not exclusive, form of embodiment of a unique machine for balancing vehicle wheels, illustrated by way of a non-limiting example, in the attached drawings, wherein.

DETAILED DESCRIPTION

Figure 1:
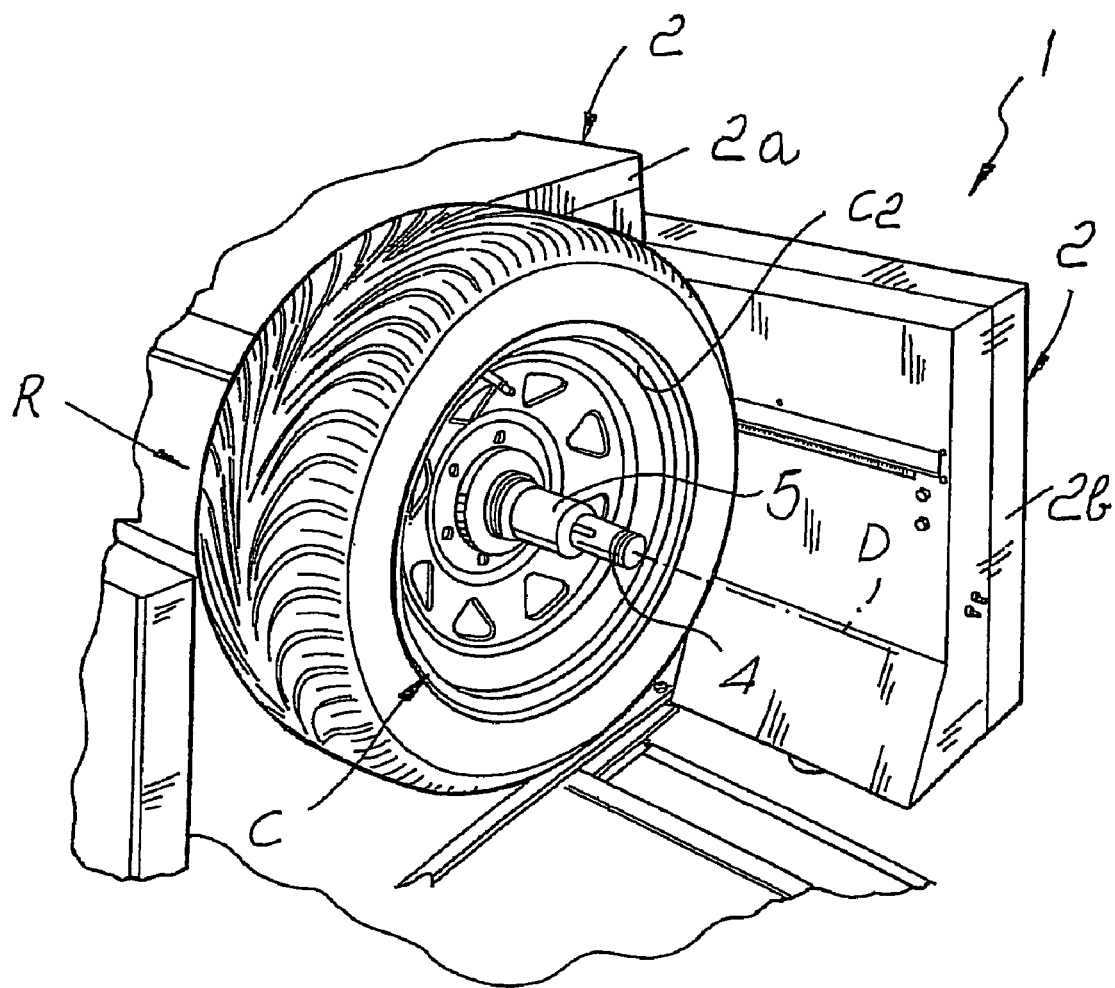
FIG. 1 is a partial view, in perspective, of the machine according to the invention.
Figure 2:
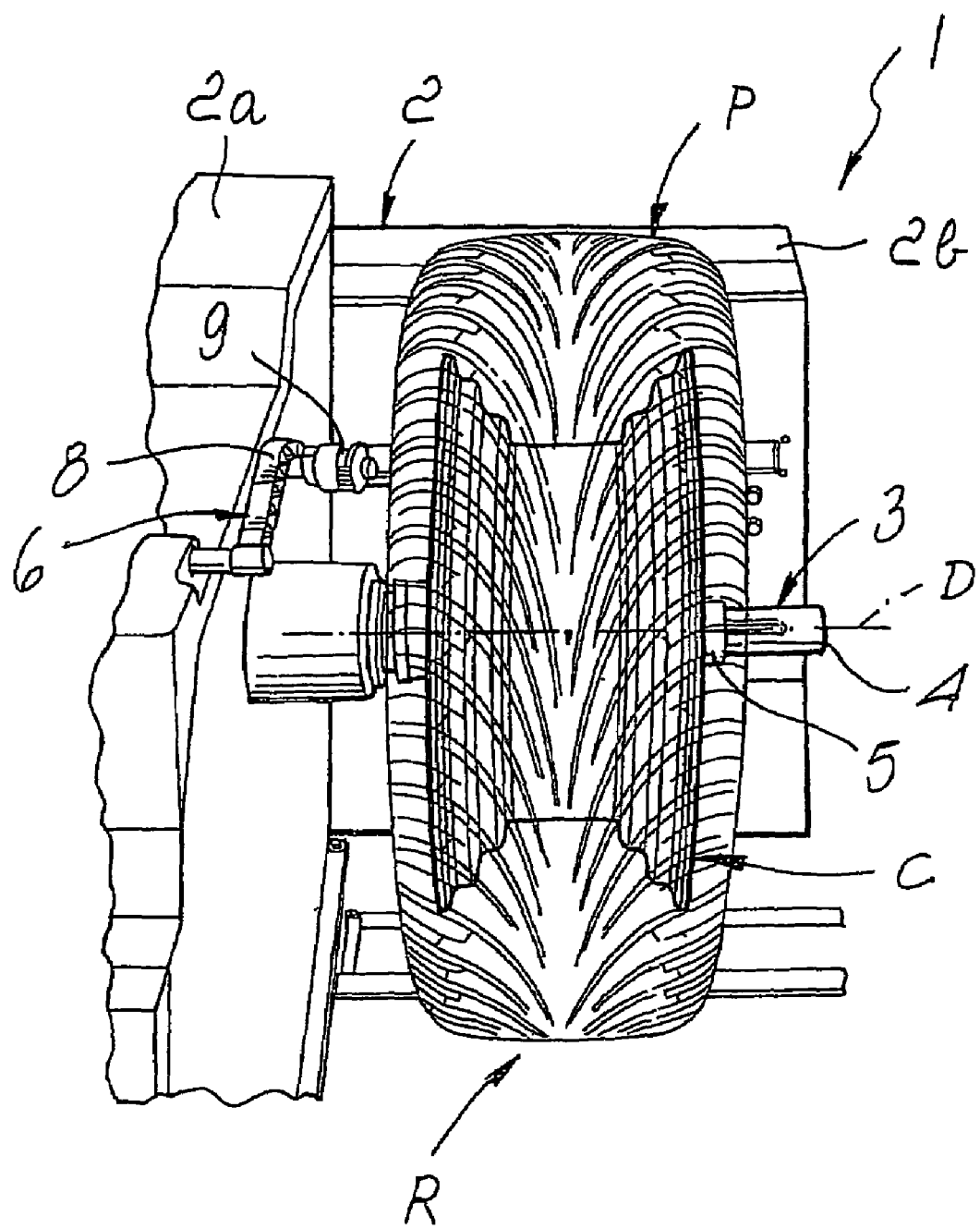
FIG. 2 is a partial and front view, in perspective, of the machine according to the invention.
Figure 3:
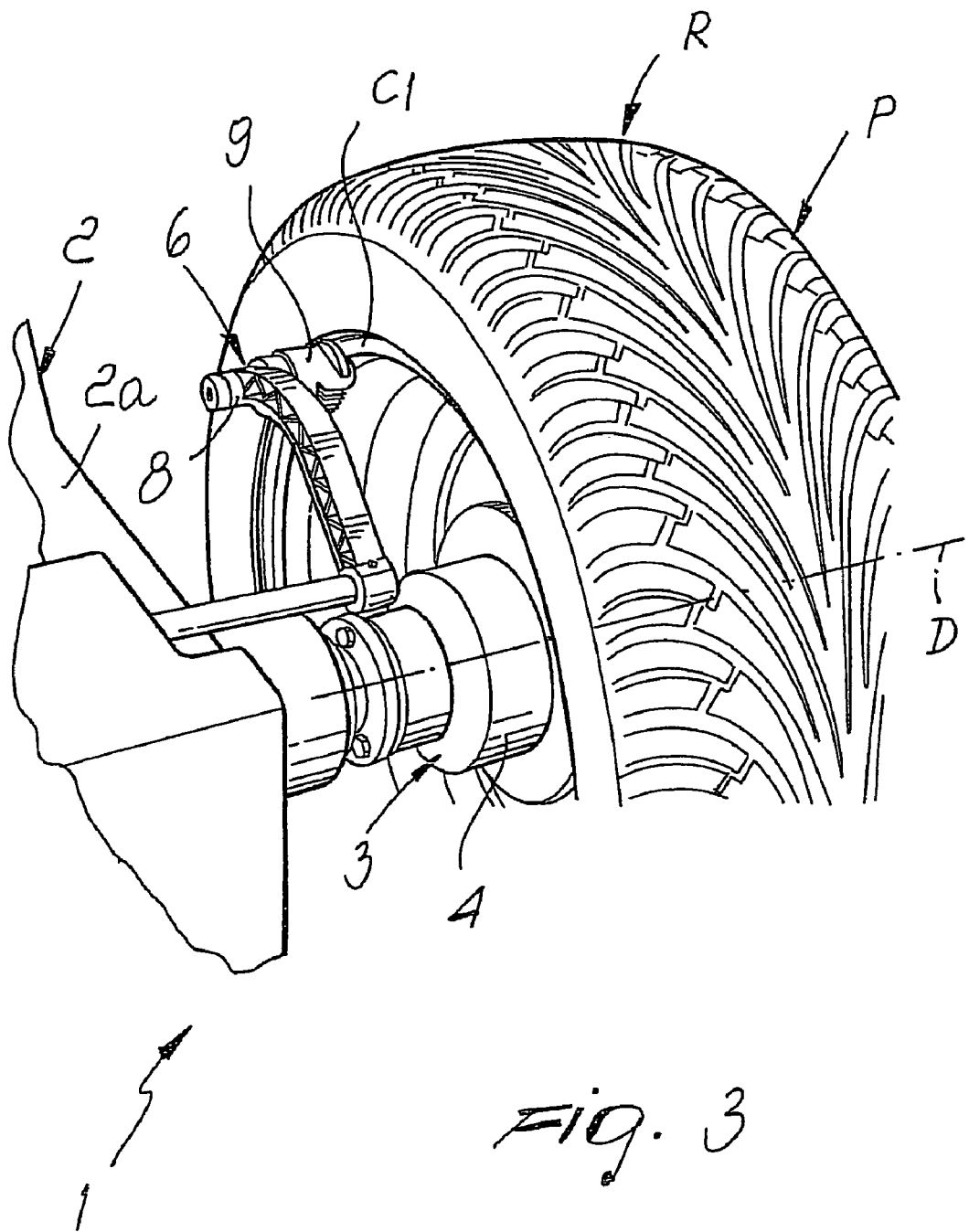
FIG. 3 is another partial view, in perspective, of the machine according to the invention.

With special reference to such figures, a machine for balancing vehicle wheels has been generally designated by reference numeral 1.

The machine 1 comprises a frame 2 that supports the gripping and rotation means 3 for a wheel R to be balanced around a horizontal axis D.

In particular, the frame 2 is made up of a base block 2a that contains the supporting and motorisation system of the gripping and rotation means 3, and of a vertical wall 2b associated with one side of the base block 2a.

The gripping and rotation means 3 are composed of a shaft 4, that defines the axis D and extends from the base block 2a parallel with the vertical wall 2b, and a bush 5, movable along the free end of the shaft 4 for centering and fixing the rim C of the wheel R.

When the wheel R is mounted on the shaft 4, a first ring-shaped flange $C_1$ of the rim C is alongside the base block 2a while the second ring-shaped flange $C_2$, opposite the first, is turned towards the outside of the machine 1.

The measuring means 6 for determining the position of the first ring-shaped flange $C_1$ of the rim C, and the detection means 7 for ascertaining the profile Pr of tire P, are mounted on the frame 2.

More specifically, the measuring means 6 include a feeler element 8 mounted on the base block 2a which slides in a direction parallel to the axis D and which conveniently features an end 9 able to allow the attachment of balancing weights to the wheel rim C.

In use, the feeler element 8 is made to slide along until it comes up against, or contacts, the first ring-shaped flange $C_1$. Under these circumstances, an electronic device (not illustrated in detail in the figures), detects the position of the feeler element 8 and hence the position of the first ring-shaped flange $C_1$ in relation to a pre-established reference system, schematically illustrated in figure 5.

In such a reference system, the position of the first ring-shaped flange $C_1$ is defined by segment AA'.

Figure 4:
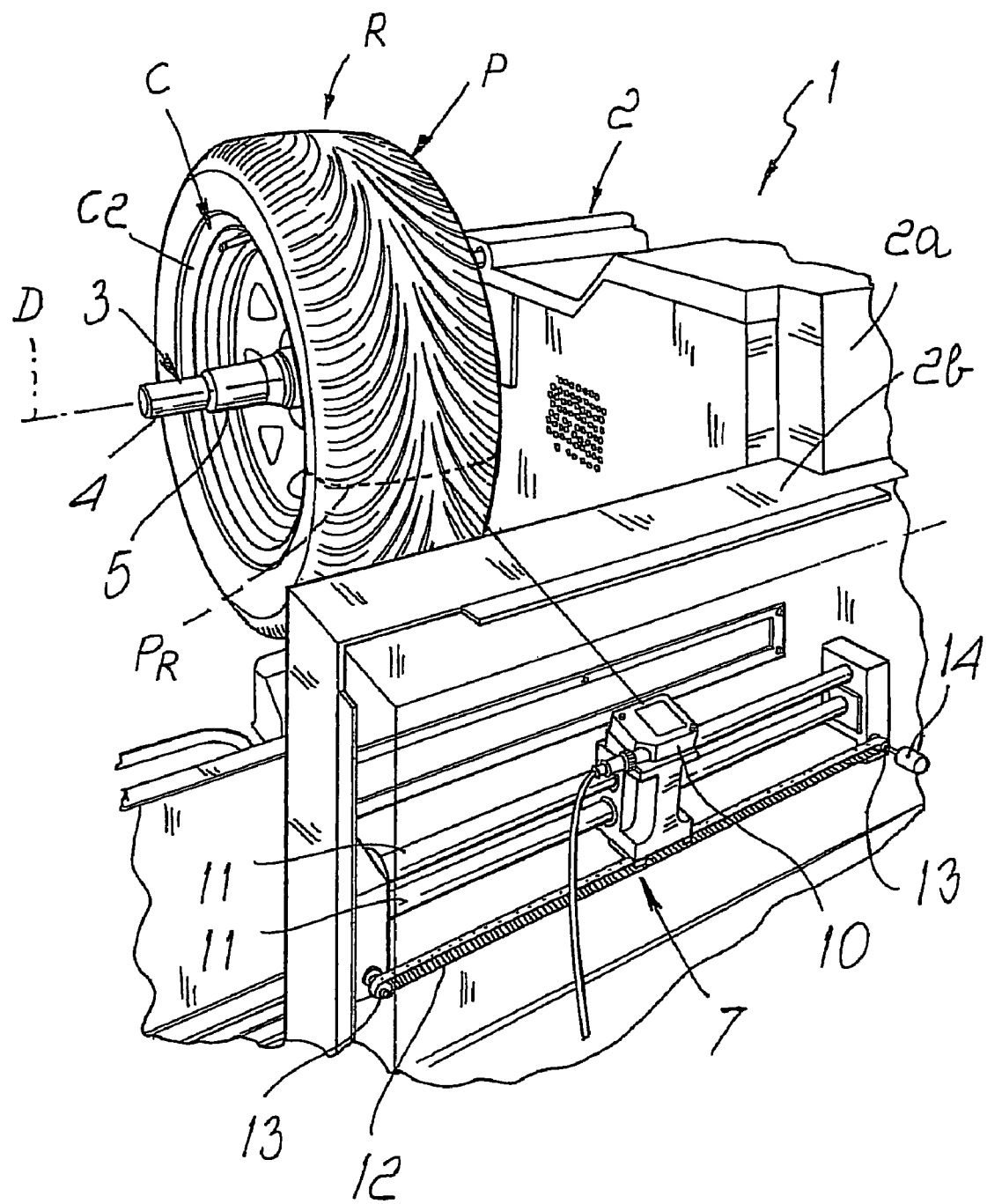
FIG. 4 is a view, in perspective, from another angle of a portion of the machine according to the invention.

Advantageously, the detection means 7 are of the contact-less type. In the particular form of embodiment of the invention illustrated in figure 4, detection means 7 comprises an optical type sensor 10 mounted for sliding movement on guide bars 11. The bars extend in a direction parallel to axis D, and the two support bars are connected to the vertical wall 2b of frame 2.

Driving means 12 cause the sensor 10 to slide along the bars 11. Such means assumes the form of a flexible element, which can be an endless belt or chain, associated with the sensor 10. The belt is wound about a pair of wheels or pulleys 13, one being the driving wheel, the other being the driven wheel.

An encoder 14 is associated with one of the wheel 13 and measures its rotation around its own axis so the axial position of the sensor 10 can be determined.

The sensor 10 is positioned in proximity to the tread of the wheel R, and emits a laser signal substantially orthogonal to axis D. By movement along the guide bars 11, the sensor is able to determine the position of a fair number of points of the tire P, defined by the values according to the extent the sensor 10 slides along the bars 11, and by the corresponding distance values of the tire P measured by the sensor itself. The several values, after interpolation, identify the profile Pr. Of the tire P.

According to the invention the machine 1 comprises a processing and control unit (not illustrated in detail in the figures), connected to the measuring means 6 and detection means 7. The processing and control unit is designed to calculate the position of the second ring-shaped flange $C_2$ dependent upon the values detected by the measuring means 6 and by the detection means 7.

In particular, from the profile Pr of the tire P the processing and control unit is able to calculate the position of the sides F1 and F2 of the tire P. In the schematic representation of the wheel R, illustrated in FIG. 5, the position of the side F1 alongside the base block 2a is defined by segment BB' while that of the opposite side F2 is defined by segment BB".

Figure 5:
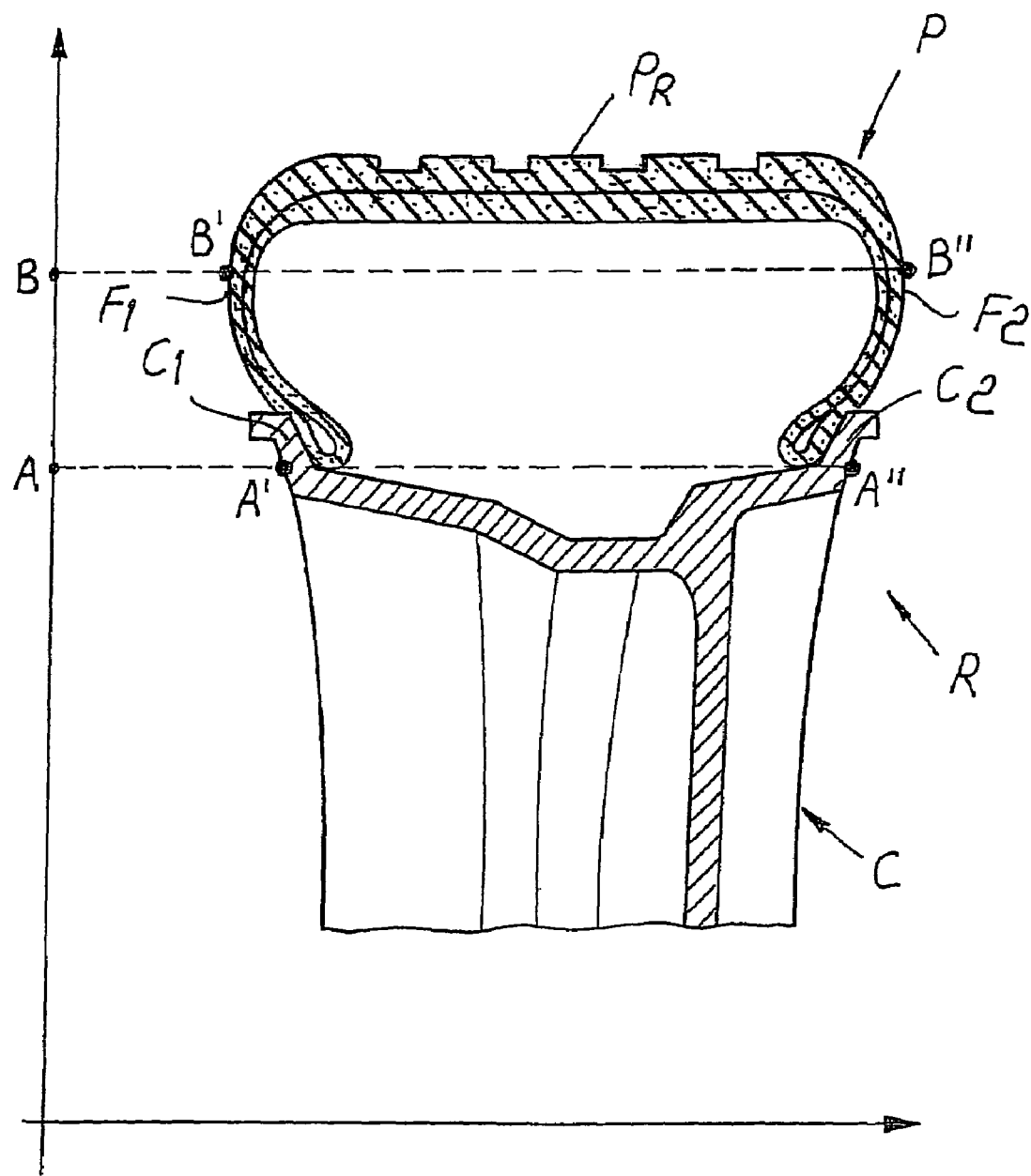
FIG. 5 is a schematic and partial cross-section view of a wheel to be balanced inserted into a machine constructed according to applicants' invention.

Once the values AA', BB' and BB" have been evaluated, the position of the second ring-shaped flange $C_2$, identified in figure 5 by segment AA", is calculated with the following formula:

$$AA''=BB''-(AA'-BB')$$

Likewise, the processing and control unit of this invention is able to evaluate the nominal width of the rim C. Indicating the thickness of the plate of rim C with an S and the same rim's nominal width with an L, we have the following:

$$L=(BB''-BB')-2*(AA'-BB')-2*S$$

Calculating L this way, it is compared by the processing and control unit with the dimensions of the rims normally found on the market. The dimensions are stored during the production and/or post-production phases in the unit's own electronic archives. Such a comparison allows the machine 1 to find the actual nominal width of the rim C before calculating the unbalance of the wheel R.

Practically speaking, it has been ascertained how the described invention achieves its intended purposes. In particular, such fact is emphasized by the machine which detects the position of both ring-shaped flanges of the wheel rim in a practical and easy way, by using a highly functional and simple structure, while leaving the tire in place on the rim.

The invention thus conceived is susceptible of numerous modifications and variations, all of which fall within the scope of the inventive concept.

Furthermore all of the structural details can be replaced with other components that are technically equivalent.

In practice, the materials used, as well as the shapes and dimensions, may be altered without falling outside the scope of protection set forth in the following claims. Consequently, the claims should be construed in a broad fashion, commensurate with applicant's significant contribution to wheel balancing machines and related technologies, and should not be restricted to their literal terms.

What is claimed is:

1. A machine for balancing a vehicle wheel comprising a wheel rim with first and second ring-shaped flanges at opposite sides of said rim, and a tire seated upon the wheel rim, said machine comprising:
    a) a frame for supporting gripping and rotation means of the vehicle wheel to be balanced around a substantially horizontal axis,
    b) measuring means secured to said frame for determining the position of the first ring-shaped flange of the wheel rim,
    c) detection means secured to said frame for determining the profile of at least a portion of the tire retained on the wheel rim, and
    d) a processing and control unit connected to said measuring means and to said detection means for calculating the position of the second ring-shaped flange of the wheel rim based upon data received from said measuring means regarding the position of the first ring-shaped flange and said detection means regarding the profile of the tire.

2. The machine as defined in claim 1, wherein said processing and control unit includes an archival storage unit, said storage unit retaining the dimensions of known wheel rims.

3. The machine of claim 1, wherein said detection means is spaced from said tire and does not contact said tire.

4. A machine for balancing a vehicle wheel comprising a wheel rim with first and second ring-shaped flanges at opposite sides of said rim, and a tire seated upon the wheel rim, said machine comprising:
    a) a frame for supporting gripping and rotation means of the vehicle wheel to be balanced around a substantially horizontal axis,
    b) measuring means secured to said frame for determining the position of the first ring-shaped flange of the wheel rim,
    c) detection means secured to said frame for determining the profile of at least a portion of the tire retained on the wheel rim, and
    d) the invention characterized by a processing and control unit connected to said measuring means and to said detection means for calculating the position of the second ring-shaped flange of the wheel rim based upon data received from said measuring means regarding the position of the first ring-shaped flange and said detection means regarding the profile of the tire.

5. A machine according to claim 4, wherein said processing and control unit calculates the position of the sides of the wheel rim dependent upon values detected by said detection means.

6. A machine according to claim 4, wherein said processing and control unit calculates the nominal width of the wheel rim dependent upon values detected by said measuring means and said detection means.

7. A machine according to claim 4, wherein said processing and control unit features electronic archives where the dimensions of wheel rims normally found on the market are stored.

8. A machine according to claim 4, wherein said measuring means comprise at least one feeler element sliding in a direction substantially parallel to said axis.

9. A machine according to claim 8, wherein said feeler element includes an end for attaching of balancing weights to the wheel rim.

10. A machine according to claim 4, wherein said detection means comprise at least one optical type sensor.

11. A machine according to claim 10, wherein said detection means includes guide means for movement of said sensor in a direction substantially parallel with said axis.

12. A machine for balancing a vehicle wheel comprising a wheel rim with first and second ring-shaped flanges at opposite sides of said rim, and a tire seated upon the wheel rim, said machine comprising:

a) a frame for supporting gripping and rotation means of the vehicle wheel to be balanced around a substantially horizontal axis,
b) measuring means secured to said frame for determining the position of the first ring-shaped flange of the wheel rim,
c) detection means secured to said frame for determining the profile of at least a portion of the tire retained on the wheel rim,
d) said detection means including guide means for movement of said detection means in a direction substantially parallel with said axis,
e) said guide means comprising at least two support bars for said detection means, said bars secured to said frame parallel to said axis, and
f) the invention characterized by a processing and control unit connected to said measuring means and to said detection means for calculating the position of the second ring-shaped flange of the wheel rim based upon data received from said measuring means regarding the position of the first ring-shaped flange and said detection means regarding the profile of the tire.

13. A machine according to claim 12, wherein said detection means further includes means for driving said detection means along said guide means, and said detection means comprises an optical sensor.

14. A machine according to claim 13, wherein said means for driving said detection means comprises at least one endless belt for securement to said sensor, said endless belt wound about at least one pair of wheels, at least one of which wheels is a driving wheel.

15. A method for balancing vehicle wheels on a machine including a supporting frame for gripping and rotation means of a vehicle wheel to be balanced around a substantially horizontal axis, said vehicle wheel having a wheel rim with first and second ring-shaped flanges for the fitting of a tire on the wheel rim, said method comprising the following steps:
a) measuring the position of the first ring-shaped flange of the wheel rim with respect to said supporting frame,
b) detecting in a contact-less manner at least one portion of the wheel tire profile with reference to said supporting frame,
c) calculating the position of the second ring-shaped flange of the wheel rim with respect to said supporting frame in accordance with the following formula:

$$AA''=BB''-(AA'-BB'),$$

wherein:
$AA''$ is the calculated position of the second ring-shaped flange of the wheel rim,
$BB'$ and $BB''$ are the detected positions of the lateral sides of the wheel tire,
$AA'$ is the measured position of the first ring-shaped flange of the wheel rim, and
d) determining the unbalance of the vehicle wheel by processing the values so obtained of the position ($AA'$,$AA''$) of said first and second ring-shaped flanges.

16. The method according to claim 15, further including the step of:
e) calculating the nominal width of the rim of the vehicle wheel to be balanced in accordance with the following formula:

$$L=(BB''-BB')-2*(AA'-BB')-2*S,$$

wherein:
L is the calculated nominal width of the wheel rim, and
S is the thickness of the plate of the wheel rim.

17. The method according to claim 16, further including the step of determining the unbalance of the vehicle wheel,
f) he step of calculating the actual nominal width of the respective wheel rim by comparing the nominal wheel rim width, as previously calculated, with the dimensions of the rims normally found on the market.

18. The method according to claim 15, wherein the measuring step of the position of the first ring-shaped flange of the wheel rim is carried out by using one feeler element sliding in a direction substantially parallel to said horizontal axis.

* * * * *